United States Patent

Schwartz

[15] 3,673,591
[45] June 27, 1972

[54] YARN DEFECT DETECTOR APPARATUS FOR TEXTILE MACHINERY

[72] Inventor: Hermann Schwartz, Adliswil, Switzerland
[73] Assignee: Siegfried Peyer, Bach, Switzerland
[22] Filed: Oct. 27, 1970
[21] Appl. No.: 84,401

[30] Foreign Application Priority Data

Nov. 6, 1969   Switzerland..........................16507/69

[52] U.S. Cl....................................340/259, 57/81, 242/36, 242/57
[51] Int. Cl........................................................G08b 21/00
[58] Field of Search.....................340/259; 242/36, 57; 57/81

[56] References Cited

UNITED STATES PATENTS

| 3,258,824 | 7/1966 | Gith.....................................242/36 X |
| 3,530,378 | 9/1970 | Holle et al..........................340/285 X |
| 2,844,788 | 7/1958 | Callender............................340/259 X |
| 3,276,227 | 10/1966 | Althaus et al..........................57/81 X |
| 3,476,329 | 11/1969 | Felix........................................242/36 |
| 3,519,922 | 7/1970 | Nash et al. .........................340/259 X |
| 3,522,913 | 8/1970 | Werffeli..................................242/36 |

*Primary Examiner*—David L. Trafton
*Attorney*—Flynn & Frishauf

[57] ABSTRACT

To detect small variations from a standard thread size and to prevent spurious operation of the yarn gauge, particularly upon re-starting of yarn winding machines after shut down, an electrical reference source is provided supplying a reference potential, which is compared with a normal signal level corresponding to yarn passing through a measuring head. An error signal, obtained upon slow deviation of the normal signal with respect to the reference, controls the amplification of an amplifier connected to the measuring head to null the error signal. Short-time signal swings indicative of defects are not compared with the reference so that defect signals are sensed normally.

9 Claims, 4 Drawing Figures

YARN DEFECT DETECTOR APPARATUS FOR TEXTILE MACHINERY

Cross-reference to related application: Ser. No. 77,189, filed Oct. 1, 1970.

The present invention relates to yarn defect detectors, and more particularly to the type of defect detector in which undesired thickened portions, loops and the like in yarn are detected, to enable defects from the yarn to be cut out if the thickness increase exceeds a certain value.

Yarn defect detectors of the type to which the present invention relates include a measuring head, operating in accordance with optical-electronic, or electrostatic principles, in order to determine the thickness of yarn passing therethrough and to provide a corresponding electrical signal which is then analyzed for desired characteristics. When the signal exceeds values corresponding to predetermined thicknesses or sizes, spooling of the yarn is interrupted and the defect is cut out. The output signal of the usual measuring head is too low in order to directly control cutters and the like; thus, amplifiers are used to amplify the sensed output signal. A measuring head suitable for use in the present invention is illustrated and described in U.S. Pat. No. 3,264,922.

The electronic defect detectors are usually used with spooling apparatus in which yarn is re-spooled from small spinning cops to larger spools which are typically cross wound spools, suitable for later use in commerce. The spooling machines frequently have a plurality of spindles. It is customary to re-spool similar yarns on the spindles of the machine. Each spindle requires its own yarn defect detector and, if the yarn is similar, the detection thresholds and operating characteristics of the defect detectors associated with the various spindles should have similar sensitivity. The sensitivity of the yarn defect detectors is, however, not constant over the operating periods, even if the defect detectors are normalized, or standardized with respect to each other upon start of any work period. Textile lint, portions of filaments, and the like, dust, and other contamination will coat the measuring head and may cause erroneous signals to be delivered from the measuring head. This is true both for the optically-electronically operating, as well as for the electrostatically operating head. The erroneous signal will be superimposed on the signal corresponding to yarn thickness, so that the output signal from the measuring head will correspond to a thickness value which is greater than that which should be delivered, that is corresponding to the actual thickness of the yarn itself. Both the optical as well as the electronic characteristics of the measuring head additionally change slowly with time, so that the output signal derived from the amplifier will shift. This drift of the signal corresponding to the nominal value of the yarn will be somewhat different for the various yarn defect detectors associated with the various spindles, so that similar yarn, spooled over various spindles of the same machine will be differently gauged.

In order to prevent drift of the output signals from the measuring head and its associate amplifier, it has been proposed to provide electronic compensation in control circuits which are responsive to a certain value taken off a suitable point within the amplifier, preferably at the amplifier output. Any change of this preset value is then compensated for by controlling a suitable control element within the amplifier. Such control systems must have a substantially large time constant so that the slow drift is compensated for, without, however, interfering with output signals which correspond to yarn defects and which usually are short and of the pulse type.

It has previously been proposed to provide circuits to separate the rapid, pulse-type signals corresponding to yarn defects from the normal output signal of the measuring head, or the amplifier, since only the defect signals have to be recognized and acted upon by the yarn spooling, and possibly cutting machine. In the simplest form, a condenser is connected into the circuit which is so dimensioned that it transfers rapid voltage swings, that is pulse-type signals but which is insensitive to direct current drift. The measuring head does not, however, distinguish between thickened defects of yarn passing therethrough and insertion of a new yarn therein; thus, when a new yarn is spliced, or inserted to yarn already within the measuring head, a signal which is similar to a yarn thickening, or defect will be generated. Such signals can be excluded by arranging a switch between the measuring head and the amplifier, or within the amplifier itself, and to open the switch when new yarn is placed in the measuring head. Unfortunately, this solution is not practicable in purely electronic control circuits, since electronic control circuits frequently cannot be separated without saturating some of the components therein; saturated components, due to the substantial long time constant of the control arrangement to prevent drift, are controlled back to the normal, operating value only in a substantial period of time. The yarn defect detector, during this period, does not operate on the same defect standards as during normal operation. To suppress undesired signals and to avoid corresponding, frequently unnecessary cuts in the yarn to be spooled, it has been proposed to utilize a discriminator between the amplifier and the yarn cutting arrangement and to set the threshold value, typically the threshold voltage of the discriminator to correspond to the thickness of a normalized yarn passing through the measuring head. The discriminator will then pass only such signals which are larger than those due to the passage of the yarn through the head. This discriminator however, limits the sensitivity of the yarn defect detector substantially and lowers the capability of the overall system to detect thickenings and defects which are less than twice the thickness of the yarn itself. It has been found that, in effect, only those defects which are at least as thick as the normal, defect free yarn itself will be recognized by the discriminator to control the cutter to cut the defective section of yarn.

It is an object of the present invention to provide a yarn defect detector which is simple and reliable in operation and which effectively recognizes yarn defects while being insensitive to slow drift and is immediately effective to detect defects even after new yarn is placed in this measuring head.

SUBJECT MATTER OF THE PRESENT INVENTION

Briefly, output signals from a yarn measuring head are applied to a signal transfer circuit which includes an amplifier and a discriminator to select signals indicative of yarn defects passing through the measuring head. A reference source supplying a reference potential is provided which is compared in a comparator such as a differential amplifier, with a normalized output signal from the amplifier itself, and which provides an error signal upon slow deviation of the output signal from the predetermined level determined by the reference source. The amplification of the amplifier is controlled by the error signal in such a manner that the error signal reverts to null. A switch is connected into the control loop formed by the comparator and the adjustment of the amplification of the amplifier to interrupt the control loop when the yarn motion itself is interrupted, that is when a defect has been cut out of the yarn.

The circuit prevents re-setting of the amplification factor of the amplifier upon interruption of yarn movement, so that changes in the output signal of the amplifier due to this interruption of yarn movement are inhibited. Thus, the yarn defect detector will become independent of the time constant of the control circuit and will be effective to operate immediately after new yarn is inserted in the measuring head. This enables the stabilized, that is the not-compensated output signal after insertion of yarn, to be placed close to the discriminator potential so that the sensitivity of the yarn defect detector can be substantially increased to recognize even small increases in thicknesses and provide suitable output signals.

This invention will be described by way of example with reference to the accompanying drawings, wherein.

Figure 1:
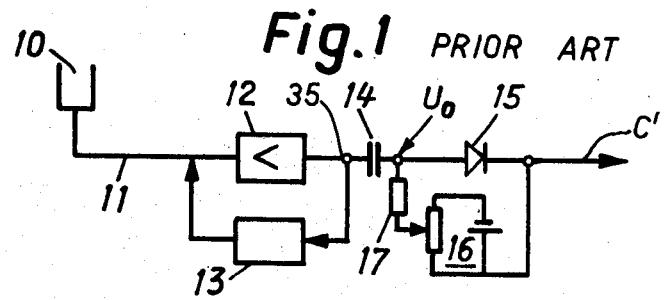
FIG. 1 illustrates a measuring and control system in accordance with the prior art, including a discriminator.

The yarn defect detector as known has a yarn measuring head 10, the output of which is conducted over line 11 to an amplifier 12. A control circuit 13, in the nature of a feed back, is arranged in parallel to amplifier 12 to provide a control signal depending on the output signal derived from the amplifier. The amplifier has quite a large time constant for the reasons above given with respect to yarn defects sensed by measuring head 10. The output of the amplifier is connected over condenser 14 with the anode of a diode 15, the cathode of which is applied over line C' to a control system for cutting arrangement, which will be described in connection with FIG. 3. A voltage source 16, having a variable voltage tap point is connected over a resistance 17 to the interconnecting line between condenser 14 and diode 15. The diode and the voltage source 16, together, form a discriminator which passes only such signals over the diode 15 which are greater than the signals set by the tap point of source 16. The circuit of resistance 17 and source 16 may be replaced by a circuit as described and claimed in copending application Ser. No. 77,189. The junction point between the output from amplifier 12 and the feedback control 13 is shown as 35, to which the circuit of the aforementioned copending application can be connected.

Figure 2:
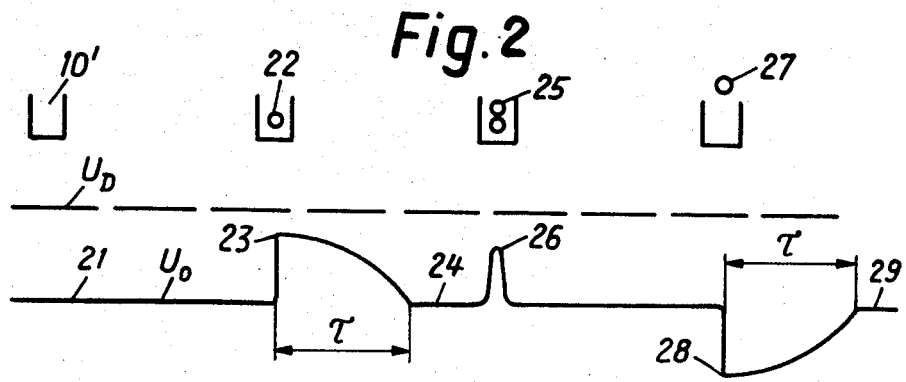
FIG. 2 is a schematic graph of signals from the output of the amplifier of FIG. 1, as determined by yarn in the measuring head.

If no yarn is in measuring head 10, as indicated at 10' in FIG. 2, then resistance 17 will have a signal voltage 21 applied thereat. As soon as yarn is placed into the measuring head as seen at 22, the signal on resistance 17 will jump to a corresponding value 23. During a time period $\tau$, the value of which depends on the time constant of the control circuit, the signal is controlled or regulated back to a value 24, corresponding to the value 21 of the measuring head without yarn therein. The time period $\tau$ in FIG. 2 is shown greatly reduced for purposes of illustration.

A thickened section 25 passing through the measuring head provides a signal 26 having a short time period. The amplitude of this signal will have approximately the same value as the amplitude of signal 23, corresponding to the thickness of the normal, defect-free yarn. If the yarn is removed from the measuring head, or if the yarn motion therethrough is interrupted for whatever reason, as illustrated at 27, a signal 28 of an amplitude similar to signal 23 and of approximately the same time duration $\tau$, cut of opposite voltage will result. The voltage will eventually be controlled back to the same empty, or free value 21.

To prevent yarn cuts, that is control from line C' to a yarn cutter when a defect free yarn is inserted into the measuring head, the voltage $U_D$ is applied to the discriminator, that is over resistance 17 to diode 14, and which is greater than the peak value of signal 23 caused by merely placing yarn into the measuring head. The unavoidable result is, however, that then only those defect signals are passed by the discriminator to line C' which exceed the threshold value of the discriminator voltage. Thus, only defect signals caused by yarn defects which are greater than the thickness of the defect-free yarn will be sensed.

Figure 3:
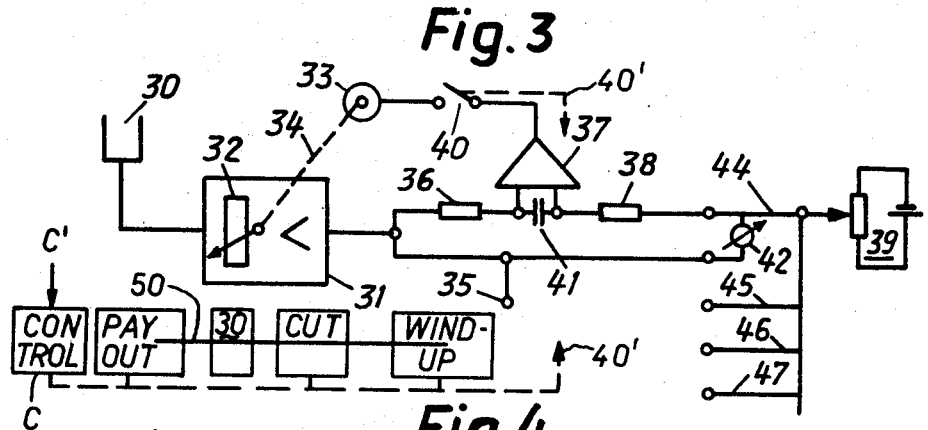
FIG. 3 is a schematic circuit diagram of the present invention, including the control system for the yarn defect detector.

The invention is illustrated in FIG. 3. A standard measuring head 30 is connected to the input of an amplifier 31, which includes an electronic component of variable value, affecting its amplification factor. The variable electronic component is controlled by a control element 33, as indicated by broken line 34. Variable component 32 typically is a resistance, and element 33 a motor setting the value, or a tap point on the resistance. Component 32 may, however, also be an inductance, a capacitor, or a photoelectric element having a variable circuit parameter dependent on the amount of light or other energy applied thereto, element 33 then being a light source of varying intensity and broken line 34 indicating a beam of light. The output of amplifier 31 is connected to junction 35 (see also FIG. 1) which is then connected to the signal transfer circuit, such as a discriminator, not further shown in FIG. 3. Additionally, the output of amplifier 31 is connected over a resistance 36 to one input of a differential amplifier 37. The other input of differential amplifier 37 is connected over resistance 38 to a line 44 and thereover to the tap point of a controllable reference voltage source 39. The output of differential amplifier 37 connects over a switch 40, controlled by a control line 40', to motor 33. Switch 40 can be operated by hand, as well as by means well known in themselves, and sensitive to movement of the yarn, or the wind up or pay out spindles. The switch will be closed only when yarn is running through the sensing head 30, that is when the yarn is in motion, or a spindle rotates. A condenser 41 is interconnected between the two inputs to differential amplifier 37 to short circuit short changes in voltage between the two inputs, that is to bypass pulse-type signals. A voltage indicator, or similar instrument 42 is connected between the output of amplifier 31 and the reference potential source 39. The output of amplifier 31, the differential amplifier switch 40, and element 33, 32 together with the control link 34 form a control loop.

Additional connecting lines 45, 46, 47 are connected to the reference source 39, in order to control a plurality of yarn defect detectors from a single adjusted reference voltage source.

The yarn winding system to which the circuit is connected is schematically indicated; a pay out spindle, for example having a spinning cop thereon passes yarn 50 through measuring head 30, then through a cutter, schematically indicated only since it is well known in the art and to a wind up spool or the like. Both the pay out as well as the wind up spindles are controlled from a controller C, having an input from line C'. The output of controller C likewise is applied to line 40', so that switch 40 will close only when thread 50 is in motion, that is when the pay out and windup spindles are running.

OPeration: Let is be assumed that, in advance of insertion of a yarn or thread into measuring head 30, switch 40 is open. This condition is illustrated at 30', FIG. 4. The control loop formed by amplifier 31, differential amplifier 37, element 33 and the controllable element 32 is then open. The output signal is indicated at 55. Upon placing yarn or thread into the measuring head, as indicated at 50 (FIG. 4) the output signal at the amplifier will jump to a value 51. It will not, however, be controlled back to its original value. The reference voltage source 39 is now adjusted until volt meter 42 shows no voltage difference between the output of amplifier 31 and reference source 39. Both inputs of differential amplifier 37 will then have the same voltage applied thereto, and no error signal will be derived from the differential amplifier. Upon closing of contact 40, element 33 will not be energized and the position of controllable element 32 will remain unchanged.

Contamination, dirt, lint, and the like which may collect in the measuring head, or which change the characteristics of the measuring head, or the amplifier, will change the output signal at the amplifier. The two inputs of the differential amplifier will then have a voltage difference thereacross which provides an error signal driving motor 33 in a direction tending to null this error signal. The direction of change of element 33 and the interconnection of this element with the variable element is so selected that any deviation of the output signal of amplifier 31 from that determined by the reference source (which is preferably accurately controlled) is compensated. The output signal 51, derived from the yarn itself will thus be held constant. If a yarn defect 52 (FIG. 4) is sensed in the measuring head, a similar voltage pulse 53 will be obtained at the output of amplifier 31. These pulses, relatively short with respect to the time constant of the control loop, will not influence the setting thereof but rather are short circuited by condenser 41. They are, however, transmitted to junction 35 for further signal processing in the discriminator, or a circuit such as referred to in the cross referenced application.

Figure 4:
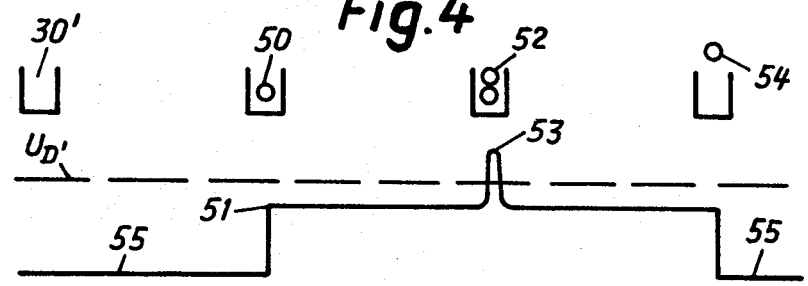
FIG. 4 is a time-graph of the output signals from the amplifier obtained from the circuit of FIG. 3, for various conditions of yarn in the measuring head.

If the yarn passing through the defect detector has sensed a thickening, so that the yarn is cut, or if the end of the yarn has been reached and yarn has been removed from the sensing head, as indicated at 54 in FIG. 4, the output voltage at amplifier 31 will drop again to the level 55. Since, however, the switch 40 will open simultaneously, the position of controllable element 32 will remain the same, since the control loop has been opened. The position itself of the controllable element has not changed. Upon placement of yarn in the measuring head, and motion of the yarn causing closing of switch 40, the previously set position of controllable element 32 will have been maintained and the yarn defect sensing device is ready to sense any defects without time delay and without requiring any run-up period.

Comparing FIGS. 2 and 4, it will immediately be seen that the system in accordance with the present invention provides an output signal at amplifier 31 which does not drop to its no-yarn level so long as yarn is running through the sensing head. Thus, so long as yarn is in motion and passes through the sensing head, the output signal of amplifier 31 will remain practically unchanged. This signal may therefore be used as a base for the defect signals, so that the sensitivity of the yarn defect detector can be substantially increased. As has been seen in the discussion in connection with FIG. 2, it was previously possible only to discriminate with respect to signals which were greater than those caused by the yarn itself. In contrast, the discriminator voltage $U_D$ in the system of the present invention can be placed close to the signal voltage 51 obtained at the output of the amplifier 31, so that yarn defects having a thickness exceeding for example by only 10 percent the normal thread thickness can be reliably sensed.

If a multiple spindle spooling machine is used and similar yarn is spooled on all spindles thereof, a single reference voltage source 39 suffices, which is adjusted by means of any one of the yarn defect detectors. The same voltage can then be applied to all other yarn defect detectors, as indicated by lines 45-47 in FIG. 3.

Various changes and modifications may be made, particularly in the nature and arrangement of the control loop which, in its simplist form, uses a motor-controlled potentiometer. Instead of a motor, a positioning relay can be used if it is of the type that the position does not change upon interruption of current therethrough.

I claim:

1. Yarn defect detector comprising a measuring head (30) having yarn (50) passing therethrough;
   a signal transfer circuit including an amplifier (31) and discriminator means (35; 14, 15, 16, 17) selecting signals (53) indicative of thickened sections in the yarn (50) passing through the measuring head;
   a reference source (39) supplying a reference potential ($U_R$);
   comparator means (37) connected (44, 38) to said reference source (39) and further connected (36) to the output of said amplifier (31) and providing an error signal upon deviation of output signal ($U_o$) from the predetermined level;
   means (32) controlling the amplification of said amplifier (31) to set the output signal ($U_o$) of the amplifier corresponding to nominal standard yarn thickness at a predetermined level (51) and memorizing the control setting thereof;
   means (33) connected to the output of said comparator means (37) and controlled by the error signal thereof controlling said amplification control means (32) of the amplifier to null the error signal;
   and switch means connected into the control loop formed by the comparator (37) and said amplification adjusting means (33), said switch means being controlled by the yarn drive to interrupt the control loop circuit upon interruption of yarn motion, the amplification control means (32) storing the setting thereof upon interruption of the control loop circuit and being effective to control the amplification of said amplifier starting from the control setting prior to interruption, upon resumption of yarn motion.

2. Detector according to claim 1 including means (41) connected to said comparator bypassing short-time differences between said reference source and amplifier output caused by yarn defects.

3. Detector according to claim 1 wherein said control loop has a long time constant to control errors due to long-time drift and accumulation of lint and the like.

4. Detector according to claim 1 wherein a condenser (41) is connected to said comparator inputs to bypass short-time differences between said reference source and the amplifier output and caused by yarn defects.

5. Detector according to claim 1 wherein the means (32) controlling the amplification factor of the amplifier comprises an electrical circuit component of variable circuit value, the circuit value setting of which is controlled by the means (33) controlled by the error signal.

6. Detector according to claim 1 wherein the comparator means (37) is a difference amplifier having one input connected to the output of the amplifier (31) and the other input connected to said reference source (39)

7. Detector according to claim 6 including a condenser (41) connected to bypass short time output pulses of the amplifier and appearing at the connection to the differential amplifier, to prevent control action of the control loop upon appearance of pulses indicative of yarn defects.

8. Detector according to claim 5 wherein the circuit component is a variable resistance.

9. Detector according to claim 5 wherein the circuit component is an electrical circuit element whose impedance is variable under control of said means (33) controlled by the error signal.

* * * * *